Oct. 18, 1966  E. C. AYER  3,280,381
ELECTROLYTIC CAPACITOR COMPRISING A SELF-SEALING VENT
Filed Sept. 13, 1962

INVENTOR.
Elmore C. Ayer
BY
Harness, Dickey & Pierce
ATTORNEYS.

:United States Patent Office 3,280,381
Patented Oct. 18, 1966

3,280,381
ELECTROLYTIC CAPACITOR COMPRISING A
SELF-SEALING VENT
Elmore C. Ayer, Bryan, Ohio, assignor to Syncro Corporation, Oxford, Mich., a corporation of Michigan
Filed Sept. 13, 1962, Ser. No. 223,413
4 Claims. (Cl. 317—230)

This invention relates to electrolytic capacitors and more particularly to a construction for venting electrolytic capacitors.

The composition of the electrolyte used in electrolytic capacitors is such that gases are evolved during its operating life and particularly when overheated or when subjected to over-voltages. An electrolytic capacitor must be sealed to prevent the ingress of moisture or egress of electrolyte during its working life and under the various conditions of operation. It is, therefore, necessary to provide a means of releasing the high internal pressures encountered with this type of capacitor in order to prevent the possibility of rupturing the capacitor housing which might result in injury to surrounding people or equipment. For this reason, it is usual to provide these capacitors with a method of venting to permit the safe release of excessive internal pressure. However, when these vents have operated, a hole is left in the capacitor casing which will permit electrolyte to leak out and short circuit or corrode wiring, printed circuits, or other components.

An object of this invention is to overcome the foregoing disadvantages by providing a novel self-sealing capacitor vent.

Another object of this invention is to provide a construction for releasing evolved gas before it builds up to high internal pressures, and further to reseal the capacitor against the ingress of moisture while preventing the escape of electrolyte.

Figure 1:
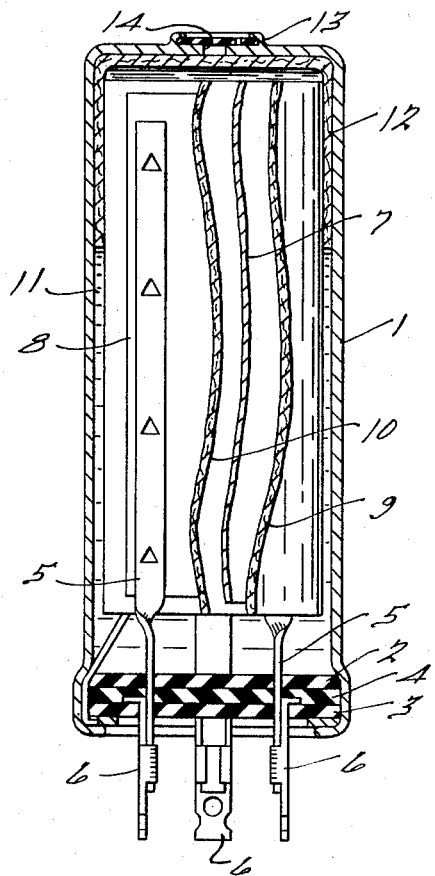
Figure 2:
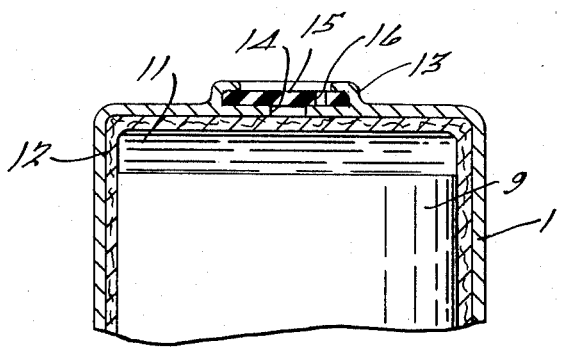

This and other objects of the invention will become apparent as the description is read in conjunction with the drawings in which:

FIGURE 1 is a sectioned front view of a twist mounting electrolytic capacitor incorporating a self-sealing pressure vent; and FIGURE 2 is a cross-sectional view of the venting arrangement.

Referring to FIGURE 1, it will be seen that the capacitor consists of an open ended aluminum container 1 sealed by a cover assembly composed of two Bakelite discs 2 and 3 and a third disc of uncured rubber 4 through which protrude the anode tabs 5 and to which are connected the capacitor solder terminals 6. Inside the container is the capacitor element consisting of convolutely wound anode and cathode foils 7 and 8 of aluminum. Between these foils are porous spacers 9 and 10 of kraft paper or the like, and the entire element assembly is impregnated in a suitable electrolyte 11. Electrical connections between the aluminum electrodes 7 and 8 and the solder terminals 6 consist of anode tabs 5 which are staked or cold welded to the electrodes and are attached to the terminals by crimping and/or electric welding. The capacitor element is firmly located within the container by means of one or more strips of thick absorbent paper 12 formed into a U-shape. Being highly porous, this paper will not affect the correct operation of the venting device, as would the pitch or tar used in the prior art, and further offers greater volume into which the electrolyte may expand if the capacitor is subjected to forces which will cause the pressure vent to operate.

Referring to FIGURE 2 which shows a cross-sectional view of the venting system, a cup-shaped molding 13 is formed into the end of the container during the normal extrusion process used to manufacture the container. A hole 14 of approximately ⅛" diameter is provided in the center of the molding 13 and a resilient rubber disc 15, provided with a small pierced hole 16, offset so as not to coincide with the center hole 14, is placed in the molding 13 which is then spun down tightly into the rubber disc 15.

Under normal conditions of operation, the rubber disc 15 rests tightly on the end of the container thereby sealing hole 14. If, due to abnormal operating conditions, the internal pressure increases to the order of 5 to 10 p.s.i., the rubber disc 15 will dilate thereby permitting pressure relief through hole 16. When the internal and external pressures have equalized, the rubber disc 15 will return to normal flatness, effectively resealing the capacitor against the ingress of moisture or other harmful contaminants.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In an electrolytic capacitor, a container, and a venting system comprising a vent hole in said container, a disc of rubber-like material overlying said hole outwardly of said container, a second vent hole in said disc offset from said first hole, and means securing the rim of said disc to said container.

2. In a venting system for an electrolytic capacitor having a metal container, a vent hole formed in one portion of said container, a disc of rubber-like material overlying said vent hole, said disc being normally in sealing relation with said vent hole to prevent foreign matter from entering the container but being distendable in a direction away from said vent hole in response to gas pressure built up within said container, a second vent hole in said disc offset from and smaller than said first vent hole, and means formed on said container and securing the edge of said disc thereto.

3. The combination according to claim 2, said last-mentioned means comprising a cup-shaped portion formed on said container and bent over said disc edge.

4. In an electrolytic capacitor, capacitor elements, an electrolytic fluid, a rigid housing enclosing said capacitor elements and fluid, porous and absorbent paper disposed between at least a portion of said capacitor elements and the interior of said housing to retain the capacitor elements in position within said housing, a vent hole in the upper portion of said housing, a disc of rubber-like material overlying said vent hole, a second vent hole in said disc offset from said first vent hole, the disc having a normal position in sealing relation with the first-mentioned vent hole to prevent the entry of foreign matter into said container but being distendable away from said sealing relation in response to gas pressure within said container, and means formed integrally with said upper container portion for securing the outer edge of said disc to said container.

References Cited by the Examiner

UNITED STATES PATENTS 2,027,137 1/1936 Yeomans _____ 317—230
2,244,395 6/1941 Hill _____ 317—230

FOREIGN PATENTS 567,602 2/1945 Great Britain.
605,077 7/1948 Great Britain.

JOHN W. HUCKERT, *Primary Examiner.*

J. D. KALLAM, *Assistant Examiner.*